(12) United States Patent
Scott

(10) Patent No.: US 10,239,546 B1
(45) Date of Patent: Mar. 26, 2019

(54) FOLDING UTILITY CART

(71) Applicant: Rella M. Scott, Baltimore, MD (US)

(72) Inventor: Rella M. Scott, Baltimore, MD (US)

(*) Notice: Subject to any disclaimer, the term of this patent is extended or adjusted under 35 U.S.C. 154(b) by 0 days.

(21) Appl. No.: 15/723,929

(22) Filed: Oct. 3, 2017

Related U.S. Application Data

(60) Provisional application No. 62/403,466, filed on Oct. 3, 2016.

(51) Int. Cl.
*B62B 3/02* (2006.01)
*B62B 3/04* (2006.01)
*B62B 3/10* (2006.01)
*A47L 13/51* (2006.01)

(52) U.S. Cl.
CPC .............. *B62B 3/022* (2013.01); *A47L 13/51* (2013.01); *B62B 3/04* (2013.01); *B62B 3/102* (2013.01); *B62B 3/104* (2013.01); *B62B 2202/021* (2013.01); *B62B 2202/028* (2013.01); *B62B 2202/50* (2013.01)

(58) Field of Classification Search
CPC ......... B62B 3/022; B62B 3/104; B62B 3/102; B62B 3/04; B62B 2202/028; B62B 2202/021; B62B 2202/50; A47L 13/51
See application file for complete search history.

(56) References Cited

U.S. PATENT DOCUMENTS

| | | | |
|---|---|---|---|
| 2,422,862 A | 6/1947 | Stottrup | |
| 2,613,951 A | 10/1952 | Rusnak | |
| 2,835,503 A | 5/1958 | Humphries et al. | |
| 4,047,724 A * | 9/1977 | Shaffer | B62B 1/002 280/47.2 |
| 4,076,349 A * | 2/1978 | Gettleman | A47B 31/02 312/236 |
| 4,521,030 A | 6/1985 | Vance | |
| 5,380,033 A * | 1/1995 | Harling | B62B 1/12 280/47.19 |
| 5,915,723 A * | 6/1999 | Austin | B62B 3/02 280/43 |
| 5,927,745 A * | 7/1999 | Cunningham | A47B 31/04 108/118 |
| 5,967,544 A * | 10/1999 | Kanta | A47C 9/027 280/47.24 |
| 6,264,230 B1 | 7/2001 | Huggins | |
| 6,889,998 B2 * | 5/2005 | Sterns | B62B 3/027 280/33.991 |
| 7,338,054 B2 * | 3/2008 | Pint | B62B 3/02 280/47.35 |
| 9,145,155 B2 * | 9/2015 | Iryami | B62B 3/027 |
| 9,457,828 B1 * | 10/2016 | Guirlinger | B62B 5/00 |
| 9,540,024 B2 * | 1/2017 | Iryami | B62B 3/027 |
| 9,731,743 B2 * | 8/2017 | Collins | B62B 5/0003 |
| 9,849,899 B1 * | 12/2017 | Guirlinger | B62B 5/00 |
| 9,862,398 B1 * | 1/2018 | Guirlinger | B62B 5/00 |
| 2004/0222605 A1 * | 11/2004 | Sterns | B62B 3/027 280/47.34 |

(Continued)

*Primary Examiner* — Jacob B Meyer

(57) ABSTRACT

A folding utility cart incorporates a plurality of wheels attached to a lower frame, a handle frame, a pail frame, and a plurality of hinges positioned to permit the cart to fold into a space-saving configuration. The cart has a plurality of storage compartments, trays, and clips, each capable of retaining commonly associated cleaning supplies therein.

20 Claims, 3 Drawing Sheets

(56) References Cited

U.S. PATENT DOCUMENTS

| | | | |
|---|---|---|---|
| 2006/0232033 A1* | 10/2006 | Pint | B62B 3/02 |
| | | | 280/79.2 |
| 2007/0120336 A1 | 5/2007 | Udall et al. | |
| 2007/0126207 A1* | 6/2007 | Rojas | B62B 3/027 |
| | | | 280/647 |
| 2012/0286498 A1* | 11/2012 | Baldemor | B62B 1/002 |
| | | | 280/651 |
| 2014/0183844 A1* | 7/2014 | Iryami | B62B 3/027 |
| | | | 280/659 |
| 2015/0336597 A1* | 11/2015 | Iryami | B62B 3/027 |
| | | | 280/651 |
| 2016/0257327 A1* | 9/2016 | Gayk, Jr. | B62B 1/12 |
| 2017/0217469 A1* | 8/2017 | Collins | B62B 5/0003 |

\* cited by examiner

FOLDING UTILITY CART

RELATED APPLICATIONS

The present invention is a continuation of and claims the benefit of U.S. Provisional Application No. 62/403,466 filed on Oct. 3, 2016, the entire disclosures of which are incorporated herein by reference.

FIELD OF THE INVENTION

The present invention relates generally to a folding utility cart having a plurality of storage compartments, trays and clips.

BACKGROUND OF THE INVENTION

With today's fast-paced lifestyles, people are becoming increasingly pressed to accomplish the variety of cleaning chores under their responsibility. For those who clean buildings or homes for a living, there are a wide variety of cleaning products that help perform a broad array of these tasks in an efficient and effective manner There exists a product, whether a tool, device, or cleaning solution, which will make virtually every job easier, no matter how large or small it may be.

However, such products and tools must be transported to the cleaning task area. While large commercial buildings utilize mobile carts to hold such tools and products, smaller buildings and homes must have the tools, buckets, supplies, and spray bottles transported by hand. Not only does this take much time when arriving and leaving a site, but the needed supplies are never at hand when needed. Accordingly, there exists a need for a means by which a cleaning supplies and tools can be easily transported wherever and whenever they are needed. The use of the folding utility cart provides for the easy transportation of large amounts of cleaning supplies from work site to work site in a manner which is quick, easy, and effective.

Various attempts have been made to solve problems found in folding utility cart art. Among these are found in: U.S. Pat. No. 2,613,951 to Rusnak; U.S. Pat. No. 5,380,033 to Harling; U.S. Pat. App. Pub. No. 2007/0120336 to Udall et al., U.S. Pat. No. 2,835,503 to Humphries et al., and U.S. Pat. No. 4,521,030 to Vance. These prior art references are representative of such folding utility cart systems.

None of the above inventions and patents, taken either singly or in combination, is seen to describe the invention as claimed. Thus, a need exists for a reliable foldable utility cart capable of storing and transporting items commonly associated with cleaning supplies, and to avoid the above-mentioned problems.

SUMMARY OF THE INVENTION

The inventor has recognized the aforementioned, inherent problems and lack in the art and observed that there is a need for a new and improved device for transporting and storing cleaning supplies in an easy to use and folding utility cart.

It is therefore an object of the invention to provide such a utility cart capable of being in a deployed configuration or a folded configuration. Such a cart further has a lower frame, including an interconnected pair of side members and lower cross members, a plurality of wheels attached to corners of the lower frame, a handle frame hingedly attached to a first lower cross member; a pail frame hingedly attached to the handle frame, a tray affixed to the pail frame, and a pail resting on the pail frame. In a preferred embodiment, the wheels are three hundred sixty degree (360°) caster wheels. At least one (1) handle hinge hingedly attaches the handle frame to the lower frame and a pair of midpoint hinges hingedly attaches the pail frame to the handle frame. The handle hinges and the midpoint hinges are capable of being locked to utilize the cart in the deployed configuration and capable of being unlocked to enable the cart to be manipulated to achieve the folded configuration.

In an embodiment of the present invention, the handle frame includes a pair of vertical members and a handle section attached to each upper end of the vertical members. In this embodiment, there are a pair of handle hinges at each lower end of the vertical members that bias the handle frame perpendicular to the first lower cross member when the cart is in a deployed configuration.

In another embodiment, there exists at least one (1) hook capable of holding a suspended item thereto. Such a suspended item could be a garbage can or bag. In certain embodiments, there is also a garbage lid that is hingedly attached to the handle section that will cover an opening of the garbage can or bag.

In yet another embodiment, there exists at least one (1) mounting clip located on the capable of retaining a long-handled item therein.

In still yet another embodiment, the pail frame has a pair of horizontal members, each having a first end and a single midpoint hinge located at a terminal second end thereof. A linear upper rear cross member attaches adjacently to the second ends of the horizontal members. A curvilinear upper front cross member attaches to the first ends of the horizontal members. The midpoint hinges hingedly attach the pail frame to the handle frame. In this embodiment, the tray is affixed between the upper front cross member and the horizontal members adjacent the first ends thereof. In other certain embodiments, the tray incorporates at least one (1) aperture capable of retaining a spray bottle of cleaning fluid therein. An upper perimeter edge of the pail can rest on the pail frame.

In yet another embodiment, there exists a wringing mechanism that can rest on the upper perimeter edge of the pail.

Furthermore, the features and advantages described herein may be combined in various manners and embodiments as one skilled in the relevant art will recognize. The embodiment and examples disclosed herein can be practiced without one (1) or more of the features and advantages described in a particular embodiment or example.

Further advantages of the embodiments and examples disclosed herein will become apparent from a consideration of the drawings and ensuing description.

BRIEF DESCRIPTION OF THE DRAWINGS

The advantages and features of the embodiments and examples disclosed herein will become better understood with reference to the following more detailed description and claims taken in conjunction with the accompanying drawings, in which like elements are identified with like symbols, and in which:

Figure 1:
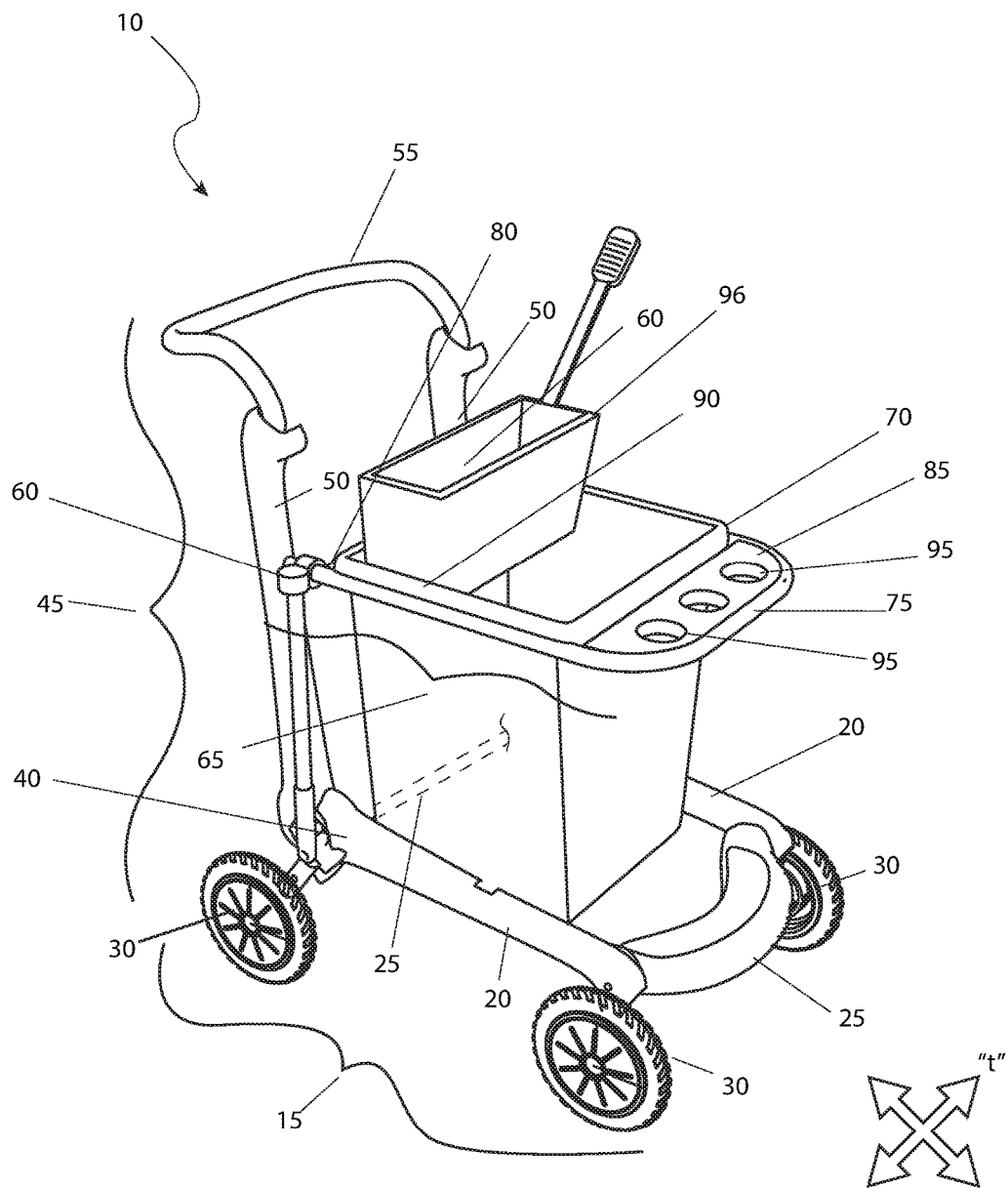
FIG. 1 is a perspective view of the collapsible utility cart 10, according to the preferred embodiment of the present invention.

DESCRIPTIVE KEY 10 collapsible utility cart
15 lower frame
20 side member
25 cross member
30 three hundred sixty degree (360°) caster
35 travel motion "t"
40 handle hinge
45 handle frame
50 vertical member
55 handle section
60 midpoint hinge
65 pail frame
70 horizontal member
75 upper front cross member
80 upper rear cross member
85 spray bottle tray
90 pail
95 circular opening
96 mop wringer
100 spray bottle
105 mounting clip
110 long handled cleaning tool
115 hanging hook
120 storage bag
121 storage bag lid
122 removable storage bag lid hinge
125 first travel path "$p_1$"
130 second travel path "$p_2$"

DETAILED DESCRIPTION OF THE PREFERRED EMBODIMENT

Figure 2:
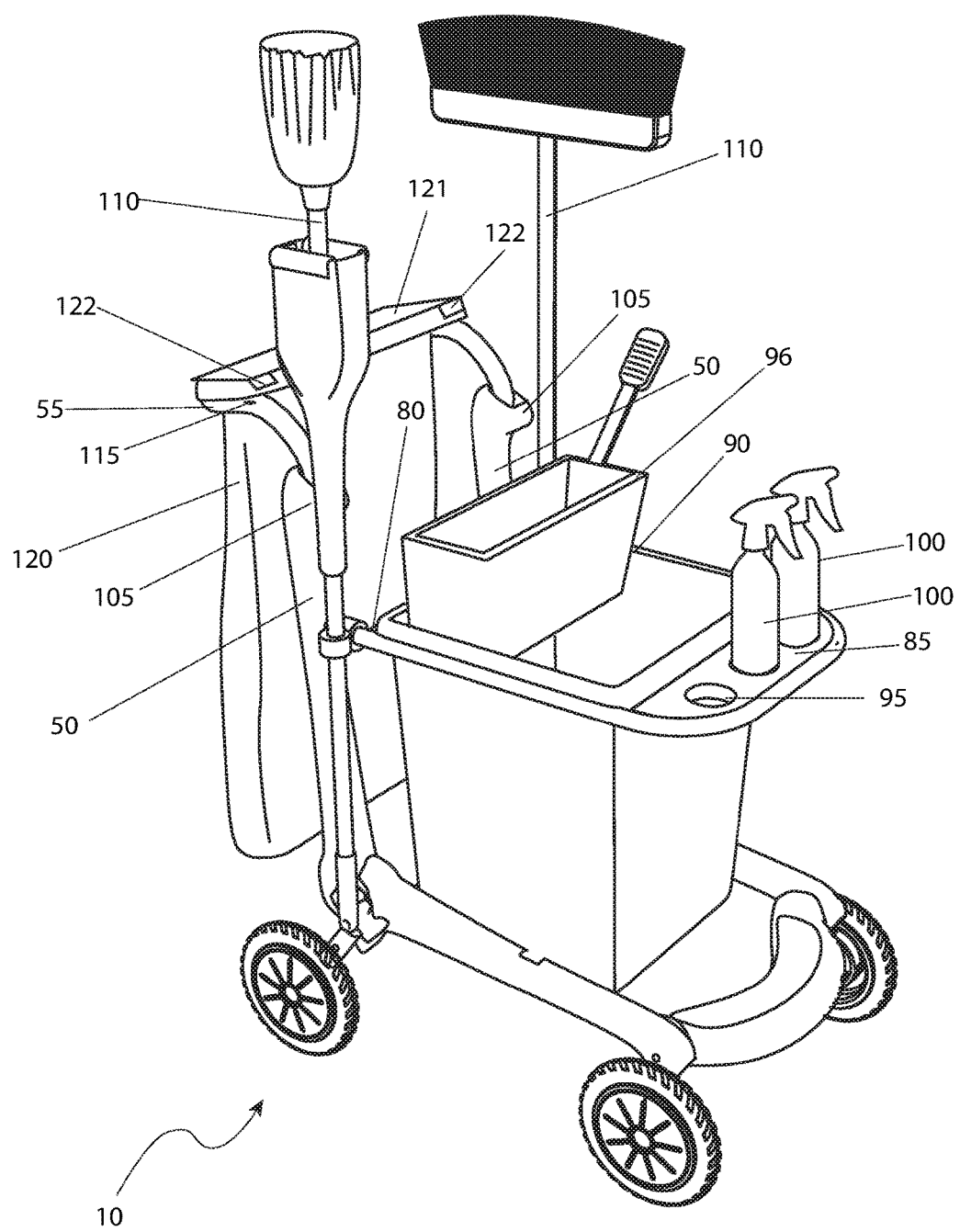
FIG. 2 is a perspective view of the collapsible utility cart 10, shown in a utilized state, according to the preferred embodiment of the present invention; and, FIG. 3 is a perspective view of the collapsible utility cart 10, shown in a collapsed state ready for storage, according to the preferred embodiment of the present invention.
Figure 3:
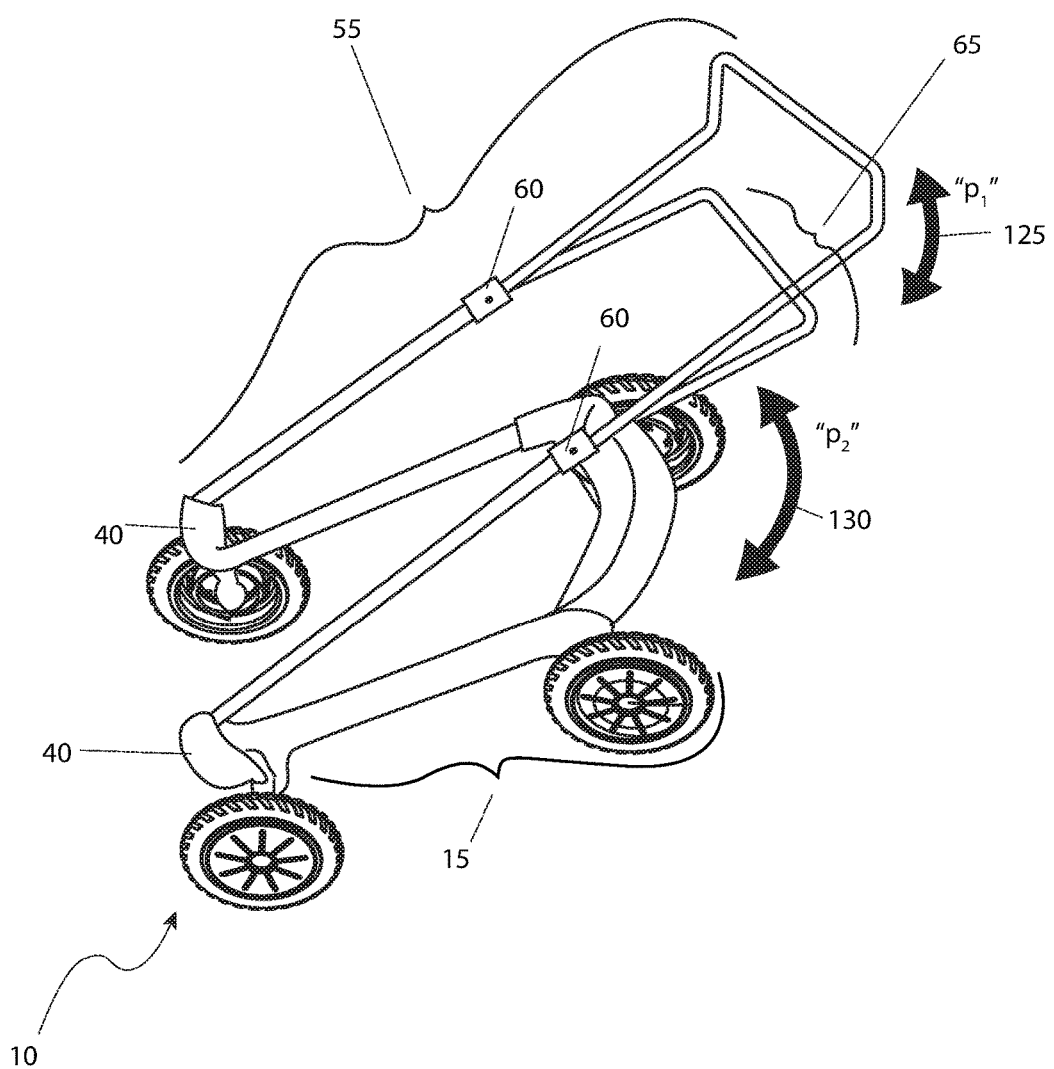

The best mode for carrying out the invention is presented in terms of its preferred embodiment, herein depicted within FIGS. 1 through 3. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

Referring now to FIG. 1, a perspective view of the collapsible utility cart 10, according to the preferred embodiment of the present invention is depicted. The collapsible utility cart 10 (herein described as the "apparatus" 10), is used to provide portability and transportation functionality to cleaning supplies and equipment. It can be used in both an indoor or outdoor environment. The apparatus 10 provides a lower frame 15 consisting of two (2) side members 20 and two (2) cross members 25 (one (1) of which is depicted by hidden lines due to illustrative limitations). The intersection of each lower frame 15 corner is provided with a three hundred sixty degree (360°) caster 30 (only three (3) of four (4) total are shown due to illustrative limitations).

The three hundred sixty degree (360°) caster 30 is envisioned to be of a large diameter tire design with an aggressive tread pattern to allow for easy traversing of rough and uneven terrain such as rough finished concrete, mud, grass, stone, gravel, asphalt and similar surfaces. It should be noted that all four (4) three hundred sixty degree (360°) caster 30 rotate three hundred sixty degrees (360°) to allow for motion defined by travel motion "t" 35. Such range of motion allows for travel in tight quarters such as small bathrooms, storage closets and the like.

The rearward portion of the lower frame 15 is provided with a total of two (2) handle hinges 40 which hold a handle frame 45 at a ninety degree (90°) angle in an upright configuration (only one (1) of two (2) total are shown due to illustrative limitations). A handle frame 45 consists of two (2) vertical members 50 and a handle section 55 connected in an inverted, generally "U"-shaped position. The handle section 55 is located at an appropriate height (envisioned to be waist height) for a user to allow for easy pushing and/or pulling of the apparatus 10. Both of the vertical members 50 are provided with a midpoint hinge 60 which connect to a pail frame 65.

The pail frame 65 comprises of two (2) horizontal members 70, an upper front cross member 75, and an upper rear cross member 80. The upper front cross member 75 is generally curvilinear and attaches to the first ends of the horizontal members 70. The upper rear cross member 80 attaches to the second ends of the horizontal members 70 and is generally linear. The pail frame 65 incorporates a spray bottle tray 85 and pail 90. The spray bottle tray 85 is affixed between the upper front cross member 75 and the first ends of the horizontal members 70 and would be provided with a minimum of three (3) circular openings 95. The pail 90 is depicted as a single opening pail; however other types or quantities of pails, such as dual pail for washing and rinsing could also be utilized, and as such, should not be interpreted as a limiting factor of the present invention. The pail 90 has a perimeter upper edge that is capable of resting on the pail frame 65 (i.e., the horizontal cross members 70, the upper front cross member 75 and upper rear cross member 80). A mop wringer 96 may or not be provided. Such a mop wringer 96 may be removably retained on the perimeter upper edge of the pail 90. It is envisioned that all components of the lower frame 15, the handle frame 45, and the pail frame 65 along with the handle hinge 40 and the midpoint hinge 60 would be made of stamped or extruded metal components comprised of steel and/or aluminum alloys. Likewise, the spray bottle tray 85, the pail 90, and the mop wringer 96 would be manufactured from impact resistant plastic in an injection and/or blow molding process.

Referring now to FIG. 2, a perspective view of the apparatus 10, shown in a utilized state, according to the preferred embodiment of the present invention is disclosed. This view provides understanding of the apparatus 10 when equipped with various cleaning supplies and tools. A set of spray bottles 100 are placed within the circular openings 95 of the spray bottle tray 85 and are capable of being retained therein. It is envisioned that the spray bottles 100 would contain various liquid-based cleaning products. The pail 90 would contain soapy water and/or clear water for rinsing. A mounting clip 105 is located at the upper portion of each vertical member 50 for a total of two (2). These mounting clips 105 are used to hold long-handled cleaning tools 110 such as mops, brooms, dusting wands, and the like. A pair of hanging hooks 115 (only one (1) of two (2) total is shown due to illustrative limitations) are located at the outward ends of the handle section 55 for the support of a storage bag 120. The storage bag 120 would be used for the containment of various cleaning supplies such as rags, wipes, dustpans, and the like. It could also be used for the collection of trash emptied from various wastebaskets around a facility or home Finally, it could also be used to store paper products and bathroom supplies such as toilet paper, hand towels, soap, or the like. A storage bag lid 121 is provided to hold the storage bag 120 in place against the handle section 55. The storage bag lid 121 is held in place via two (2) storage bag lid hinges (2) which can be removed for disassembly. These hinges are located also on the handle section 55, adjacent the hanging hook 115.

Referring finally to FIG. 3, a perspective view of the apparatus 10, shown in a collapsed state ready for storage, according to the preferred embodiment of the present invention is shown. The apparatus 10 is designed to collapse into a generally flat shape to allow for ease of storage and transportation. The collapsing process is similar to that which would be expected when collapsing a baby stroller for transportation in a motor vehicle. The collapsing or folding process provides for the pail frame 65 to fold up against the handle section 55 by following a first travel path "$p_1$" 125 by disengaging a locking mechanism on each midpoint hinge 60. Next, the lower frame 15 folds up against the handle section 55 by following a second travel path "$p_2$" 130 by disengaging a locking mechanism on each handle hinge 40. Once collapsed and in a configuration as depicted in FIG. 3, the apparatus 10 would be lifted and placed inside of a motor vehicle such as the trunk of an automobile, the back of a sport utility vehicle (SUV), or the cargo area of pickup truck. It may also be placed in the back seat area of an equipped motor vehicle as well. The reduced size as shown as shown in FIG. 3 also allows the apparatus 10 to be stored in a small location such as in a storage closet, in a basement, or even placed on a shelf. However, it should be noted that while the apparatus 10 does afford a reduced footprint for storage, it may be left in an expanded configuration, complete with supplies and tools (as shown in FIG. 2), and placed within a janitorial closet in a "ready-to-utilize" configuration.

The preferred embodiment of the present invention can be utilized by the common user in a simple and effortless manner with little or no training. It is envisioned that the apparatus 10 would be constructed in general accordance with FIG. 1 through FIG. 3.

It is envisioned usage of the apparatus 10 would begin from the collapsed configuration of FIG. 3. The user would first fold away the lower frame 15 from the handle section 55 and lock the handle hinge 40 into place. Next, the pail frame 65 would be folded away from the handle section 55 and the midpoint hinge 60 would be locked into the place. At this point in time, the apparatus 10 is ready to be stocked with various cleaning supplies and equipment to perform the desired cleaning task at hand.

The user would thusly place the pail 90 within the pail frame 65 and any spray bottles 100 within the circular openings 95 of the spray bottle tray 85. Next, any long-handled cleaning tools 110 would be placed within the mounting clip 105 on the vertical members 50. Finally, the storage bag 120 and any contained items are hung from the hanging hook 115. The storage bag lid 121 may be installed with the use of the storage bag lid hinge(s) 122. At this point in time, the apparatus 10 is ready for use.

When finished with use, the apparatus 10 is emptied and collapsed as aforementioned described in FIG. 3, thus readying the apparatus 10 for storage and/or transportation in a systematic and renewing process.

The apparatus 10 is envisioned for use by cleaning personnel that move from site to site throughout the day in a motor vehicle and would eliminate repeated trips back and forth to the vehicle for the purposes of obtaining forgotten equipment and supplies. The apparatus 10 will also find use by homeowners or those who clean large buildings and facilities at one (1) location throughout the day. The design of the apparatus 10 provides the easy transportation of heavy supplies, equipment, and materials and reduces chances of possible injury from carrying heavy objects.

The foregoing descriptions of specific embodiments have been presented for purposes of illustration and description. They are not intended to be exhaustive or to limit to the precise forms disclosed and many modifications and variations are possible in light of the above teachings. The embodiments were chosen and described in order to best explain principles and practical application to enable others skilled in the art to best utilize the various embodiments with various modifications as are suited to the particular use contemplate

What is claimed is:

1. A collapsible utility cart, comprising:
a lower frame, comprising a first side member, a second side member, a first lower cross member interconnecting first ends of each side member, and a second lower cross member interconnecting second ends of each side member;
a plurality of wheels, each located at a corner of said lower frame;
a handle frame hingedly attached to said lower frame via at least one handle hinge, comprising a pair of vertical members and a handle section interconnecting said vertical members;
a pail frame hingedly attached to said vertical members, each via a midpoint hinge, comprising a pair of horizontal members, an upper front cross member interconnecting first ends of said horizontal members, and an upper rear cross member interconnecting second ends of said horizontal members;
a tray affixed to said upper front cross member and said first ends of said horizontal members; and,
a pail having a perimeter upper edge capable of being supported on said pail frame;
wherein each midpoint hinge is lockable to secure said pail frame to said vertical members;
wherein each handle hinge is lockable to secure said lower frame to said pair of handle frame vertical members; and,
wherein unlocking each midpoint hinge and each handle hinge enables said cart to be manipulated between a deployed configuration and a folded configuration.

2. The cart of claim 1, wherein said plurality of wheels are each 360° caster wheels.

3. The cart of claim 1, further comprising two handle hinges attaching said handle frame to said first cross member.

4. The cart of claim 3, wherein said handle frame is generally disposed in an inverted U-shape.

5. The cart of claim 4, wherein said handle frame is disposed perpendicular to said lower frame when said cart is in said deployed configuration.

6. The cart of claim 1, wherein each midpoint hinge is located at a terminal location of a respective second end of said horizontal members.

7. The cart of claim 1, wherein said tray further comprises a plurality of apertures, each capable of supporting a bottle therein.

8. The cart of claim 1, further comprising a mounting clip located at an upper portion of each of said vertical members, each capable of retaining a handle of a tool therein.

9. The cart of claim 1, further comprising at least one hook located on an outward end of said handle section, capable of supporting a suspended item.

10. The cart of claim 9, further comprising a lid hingedly attached to said handle section, capable of covering said suspended item.

11. A collapsible utility cart, comprising:
a lower frame, comprising a first side member, a second side member, a first lower cross member interconnecting first ends of each side member, and a second lower cross member interconnecting second ends of each side member;
a plurality of wheels, each located at a corner of said lower frame;
a handle frame hingedly attached to said lower frame via at least one handle hinge, comprising a pair of vertical members and a handle section interconnecting said vertical members; and,
a pail frame hingedly attached to said vertical members, each via a midpoint hinge, comprising a pair of horizontal members, an upper front cross member interconnecting first ends of said horizontal members, and an upper rear cross member interconnecting second ends of said horizontal members;
a tray affixed to said upper front cross member and said first ends of said horizontal members;
a pail having a perimeter upper edge capable of being supported on said pail frame; and,
a wringing mechanism capable of being placed on said pail perimeter upper edge and retained thereon;
wherein each midpoint hinge is lockable to secure said pail frame to said vertical members;
wherein each handle hinge is lockable to secure said lower frame to said pair of handle frame vertical members; and,
wherein unlocking said midpoint hinge and each handle hinge enables said cart to be manipulated between a deployed configuration and a folded configuration.

12. The cart of claim 11, wherein said plurality of wheels are each 360° caster wheels.

13. The cart of claim 11, further comprising two handle hinges attaching said handle frame to said first cross member.

14. The cart of claim 13, wherein said handle frame is generally disposed in an inverted U-shape.

15. The cart of claim 14, wherein said handle frame is disposed perpendicular to said lower frame when said cart is in said deployed configuration.

16. The cart of claim 11, wherein each midpoint hinge is located at a terminal location of a respective second end of said horizontal members.

17. The cart of claim 11, wherein said tray further comprises a plurality of apertures, each capable of supporting a bottle therein.

18. The cart of claim 11, further comprising a mounting clip located at an upper portion of each of said vertical members, each capable of retaining a handle of a tool therein.

19. The cart of claim 11, further comprising at least one hook located on an outward end of said handle section, capable of supporting a suspended item.

20. The cart of claim 19, further comprising a lid hingedly attached to said handle section, capable of covering said suspended item.

* * * * *